UNITED STATES PATENT OFFICE.

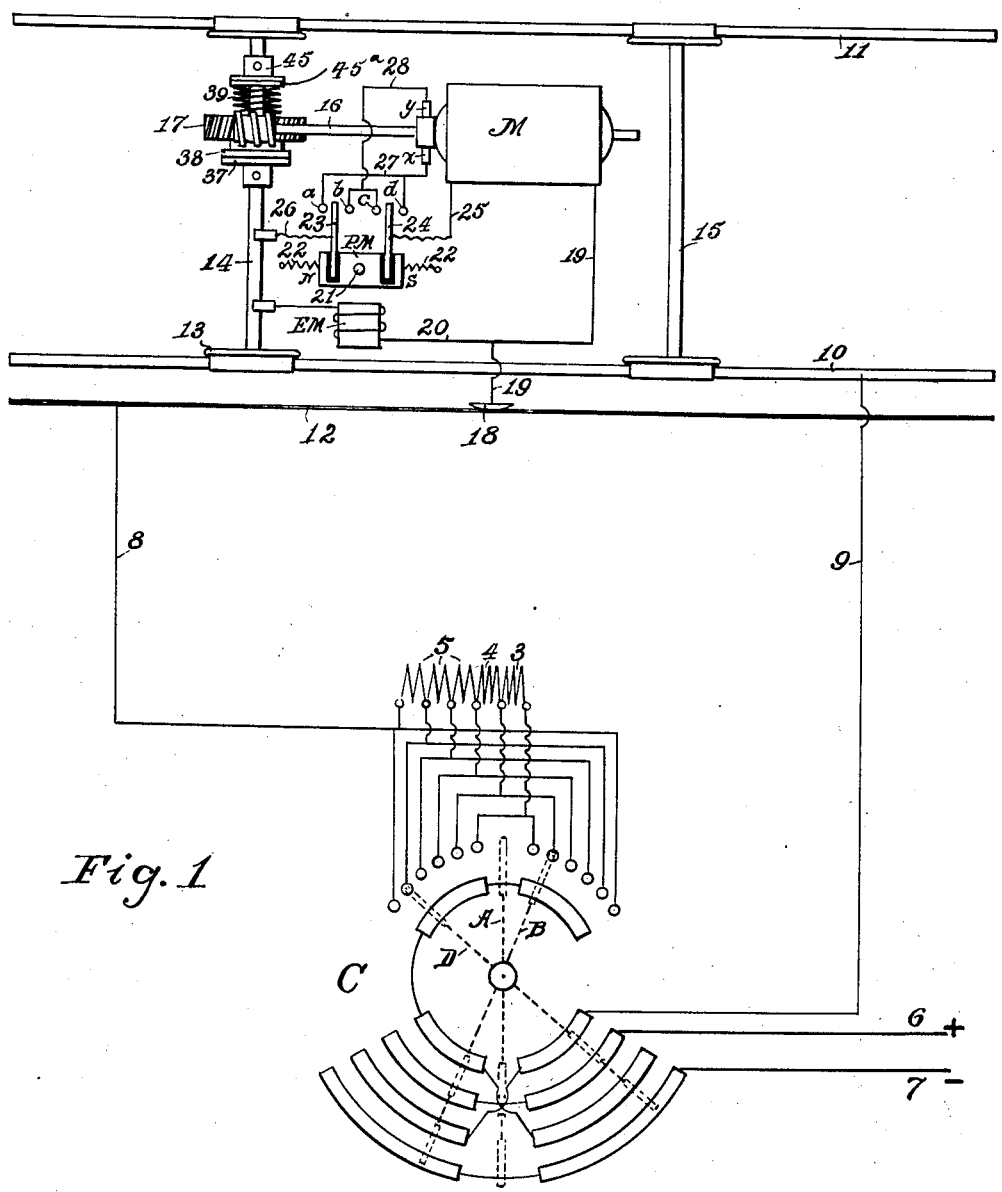

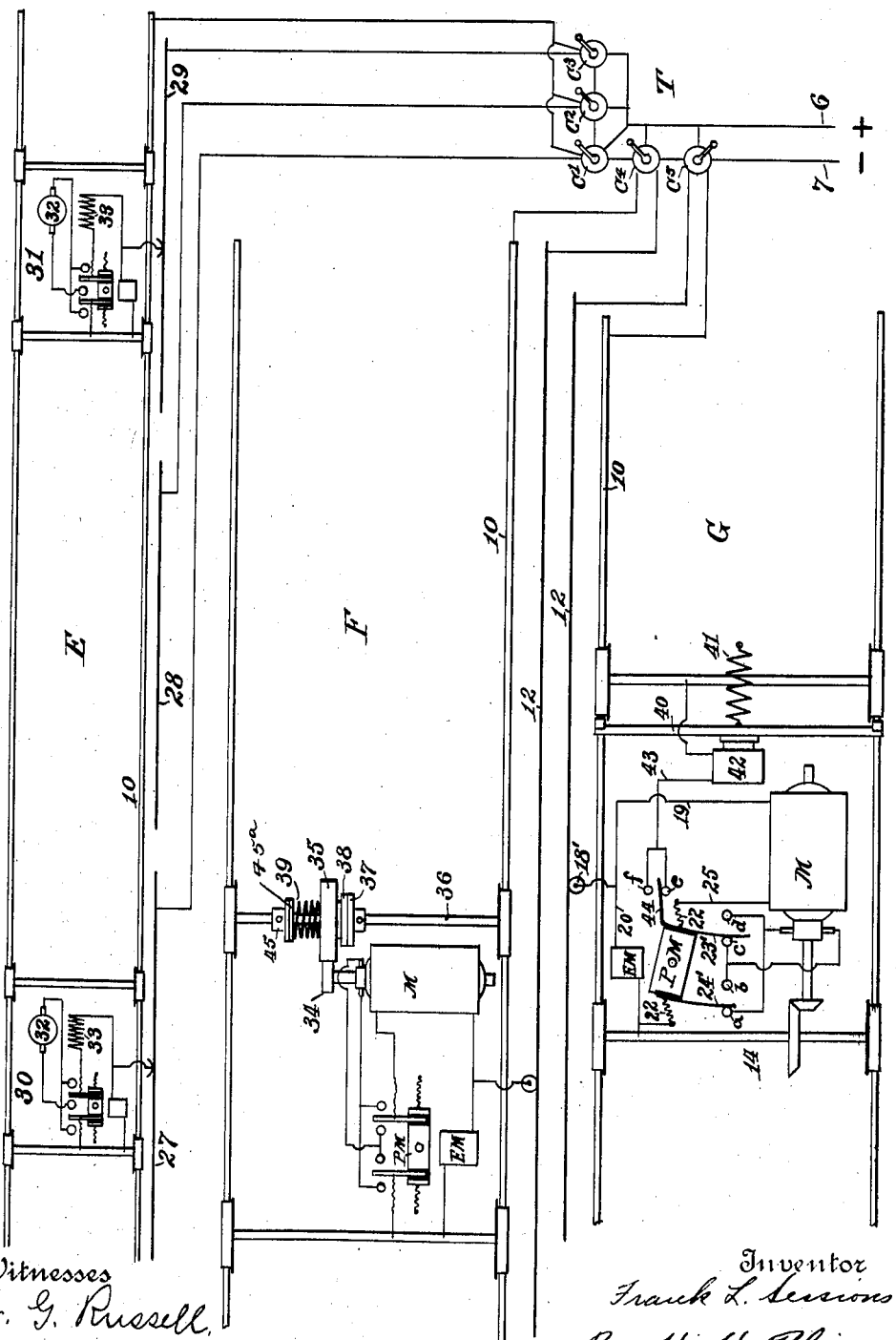

FRANK L. SESSIONS, OF COLUMBUS, OHIO, ASSIGNOR TO THE JEFFREY MANUFACTURING COMPANY, A CORPORATION OF OHIO.

SYSTEM FOR CONTROLLING ELECTRIC LOCOMOTIVES FROM A DISTANT POINT.

1,185,842. Specification of Letters Patent. Patented June 6, 1916.

Application filed February 21, 1910. Serial No. 545,131.

*To all whom it may concern:*

Be it known that I, FRANK L. SESSIONS, a citizen of the United States, residing at Columbus, in the county of Franklin and State of Ohio, have invented certain new and useful Improvements in Systems for Controlling Electric Locomotives from a Distant Point, of which the following is a specification, reference being had therein to the accompanying drawing.

This invention relates to electric railways and particularly to the operation and control of locomotives or motor cars wholly from a central or distant station.

One of the objects of this invention is to provide an improved and simplified equipment whereby a locomotive or motor car may, by an operator at a distant point, be started and stopped, its speed regulated, and its direction reversed at will.

Another object is to so arrange the track system, the apparatus at the central station and the circuit connections that several cars may be operated upon the same track.

Another object is to provide in combination with the distance control system means for automatically braking the locomotive wheels upon the stopping of the motor.

The ultimate object of the invention is the production of an economical and effective system for handling locomotives or motor cars in quarries or in foundries or in like places where material is to be moved over relatively short distances and from point to point within a limited area. Such a system is economical because it dispenses with an attendant for each car and therefore dispenses with the manual controller on each car, which is always in the way and liable to damage or injury on cars of the class in question. In a system of this sort also, all the cars may be operated and controlled by one man from a central station or tower so located that he can keep the whole system in view. It is therefore safer and much more effective than a system in charge of several individuals.

To the realization of these objects, the invention consists in the structure of parts and their combination in the system outlined, substantially as herein described and claimed.

The invention is graphically illustrated in the accompanying drawings, which form a part of this specification, and wherein—

Figure 1 represents a unit of the system, comprising a portion of track with one motor car upon it and the central station controller for operating said car; while in Fig. 2 there is represented a single track with two motor cars upon it and two other independent tracks with a motor car on each and a central station equipment by which all the cars are operated and controlled.

Referring to Fig. 1, at C is typified the controller provided with the necessary contacts, displayed to show relative location and circuit connections. The rheostat connected therewith is provided with two coils, 3 and 4, of higher resistance than the remaining coils 5. The conductors leading from the source of power are indicated at 6 and 7 and the line wires are indicated at 8 and 9. The track rails are represented at 10 and 11, while the working conductor is represented at 12, which may be a trolley wire or third-rail as circumstances may require. Line wire 8 is shown connected to the working conductor 12, line wire 9 to rail 10.

The locomotive, or motor car, is typified by its wheels 13 and axles 14 and 15. The driving motor at M may be any suitable motor and is here shown geared to the motor axle 14 by worm gearing, the worm being upon the armature shaft 16 and the worm wheel 17 upon the axle 14. The worm wheel is frictionally connected with the axle 14. The friction connection may be of any of a number of sorts but it is here illustrated as comprising a disk 37 secured to the axle, a disk 38 fixed to the gear 17 which is loose on the axle and a spring 39 serving to press the two disks into contact. The spring 39 abuts against an idler collar 45$^a$ which in turn engages the collar 45 secured to the shaft. In the motor represented, the field and armature are shown in series but this is simply for convenience in illustration, since any other combination may be used, and while the current may be reversed in either the field or armature, it is here shown as reversed in the armature. For the purpose of reversing the current in the motor, applicant prefers to use a polarized switch which he locates in the circuit between the armature and the field. This switch preferably consists of an electro-magnet EM in a branch 20 of the line circuit and a permanent magnet PM pivoted as at 21 in the field of magnet EM. The pivoted permanent magnet is preferably held in neutral position by suitable springs. Such springs are indicated at 22. The movable contacts of this switch are mounted upon, but insulated from the pivoted magnet and are represented at 23 and 24. The fixed contacts are represented at *a*, *b*, *c* and *d* and the contacts 23 and 24 rest normally between and out of engagement with *a b* and *c d*, respectively, as illustrated.

The movable contact 24 is connected to the field circuit by conductor 25 and the movable contact 23 to the return circuit-rail 10 by way of conductor 26, axle 14 and wheel 13. The branch 20 containing magnet EM may be connected to the return circuit in the same way. The armature is connected through its commutator brushes *x* and *y*, and conductors 27 and 28, respectively, to the fixed contacts of the switch as indicated.

In the operation and control of the motor car in the unit system described, the controller arm in its "off" position may be indicated by the dotted lines at A, then the car will be standing still and its polarized switch will stand as represented in the drawings, the motor circuit being interrupted between field and armature. By moving the controller arm into the position indicated by dotted lines at B, current will pass from feeder 6 through the controller and rheostat coils 4 and 5, line wire 8 to working conductor 12, thence by shoe 18, conductor 19 and branch 20 through the coil of magnet EM and to axle 14, wheel 13, rail 10, line 9 and back through the controller and return feeder 7. The energization of magnet EM makes the upper end thereof, for example, a north pole, and the permanent magnet PM having been mounted with its south pole (S) to the right, that end will swing down and so carry the contacts 23 and 24 on to studs *b* and *d* respectively. Line current will then flow from shoe 18, through conductor 19, the field of motor M, conductor 25, contact 24, stud *d*, conductor 27, brush *x*, through the armature of motor M, brush *y*, conductor 28, stud *b*, contact 23, conductor 26, axle 14, wheel 13, rail 10, line 9, and through the controller to return feeder 7. By further movement of the controller to the right, one after another of the coils of the rheostat may be cut out and the motor speeded up. To stop the car, the controller arm is swung back to position A, when current will be cut off from the motor. The armature then will stop and the friction disks acting because of the worm gearing will exert a braking effect upon the driving axle. It will be understood that as soon as the motor stops the worm will also stop and will automatically lock the worm wheel 17 against rotation. The worm wheel holds the disk 38 against rotation and the frictional resistance offered by the disk 38 to the disk 37 serves to quickly bring the axle and the wheels to a rest. To reverse the movement of the car, the controller arm will be gradually moved toward the position indicated by dotted lines at D. Then the flow of current will be from the feeder 6 through the controller to rail 10, thence by wheel 13, axle 14 and conductor 20 through the coil of magnet EM, conductor 19, to shoe 18, working conductor 12, line 8 and through the rheostat and controller to return feeder 7. This will energize magnet EM and make its upper end a south pole, thereby causing it to attract the left end or north pole (N), of the magnet PM and so swing contacts 23 and 24 onto studs *a* and *c*, respectively. Line current will then flow from rail 10 through wheel 13, axle 14, conductor 26, contact 23, stud *a*, conductor 27 to brush *x*, thence through the armature, in the same direction as before, then by brush *y*, conductor 28, stud *c*, contact 24, conductor 25 and through the field, in the reverse direction from that which it passed before, and then by conductor 19, shoe 18, working conductor 12, line 8, to and through the rheostat and controller contacts and back over feeder 7. By providing high resistance as 3 and 4 for the first steps of the controller arm, it may be thrown to the reverse position without causing too much of a retarding effect to be suddenly applied to the car and will therefore provide for safely reversing the motor to supplement the normal braking action of the disks 37 and 38.

The combination of such units, as above described, for use in a quarry or foundry, is depicted in Fig. 2, each having a controller located at a central station or tower as at T. In this figure, at E is represented a track on which as many as three cars may be individually operated and controlled. To this end a sectional working conductor is provided. The sections of this conductor, as 27, 28 and 29, are insulated from each other and are connected to their respective controllers C', C², and C³ at the tower T. Two cars, 30 and 31, are indicated on this track, each equipped substantially the same as the car in Fig. 1. At each car the armature and field of the motor are diagrammatically illustrated at 32 and 33, respectively, and the two middle studs of the polarized switch have been merged. Obviously either of the cars 30 and 31 may be operated and controlled on any one of the sections, in the same manner as described in connection with Fig. 1, and any car can be run onto any unoccupied section and there maneuvered at pleasure from the tower through the controller of that particular section.

At F in Fig. 2 is depicted a locomotive or motor car equipped with motor and switch substantially the same as in Fig. 1. Here, however, the transmission from armature to axle is by spur gearing, pinion 34 and gear 35, and the gear 35 is preferably frictionally connected to the axle 36 to aid in bringing the car smoothly to a stop when braking is effected by reversing the motor. The friction connection may be of any sort, but it is here illustrated as being similar to that already described as a part of the construction shown in Fig. 1. It comprises disk 37 fixed to the axle, disk 38 fixed to the idly mounted gear 35 and spring 39 located between gear 35 and idly mounted collar 45ᵃ which is held in position by collar 45 fixed to the axle for pressing said disks together.

Any other means for automatically braking, aside from those already referred to, may be employed. In the equipment of the car illustrated on track G, Fig. 2, an electro-mechanical braking device is depicted wherein the brakes on bar 40 are applied by springs, typified at 41, and are held out of action by electro-magnetic means when the motive current is on. Such electro-magnetic means are typified by the magnet 42, which may be located in a branch 43 from the field circuit of motor M. As will be seen by reference to the car, current from working conductor 12 passes by trolley 18' and conductor 19 to the field of motor M, thence by conductor 25 to the contact 23' on one end of the pivoted permanent magnet PM. Here it divides and a part goes through contact 44, stud $e$, conductor 43, and electro-magnet 42, through axle and wheel to the return rail 10, and the other part by contact 23' to stud $c$ and through the armature to stud $a$, thence to contact 24' and through axle 14 and its wheel back by the return rail circuit 10. When the current is reversed at controller C⁵ in the tower and magnet PM tilts in the opposite direction, the contact 44 engages stud $f$ and again current branches through magnet 42 and the brakes are pulled off as before. When current is cut off at the tower to stop the motor, the brakes go on and stop the car. It will be noted that the contacts, 23' and 24', carried by the pivoted permanent magnet PM, are attached to the ends of said magnet, but insulated therefrom, and engage the sides of the coacting studs, also that the springs 22 for returning the magnet PM and its contacts to neutral position may carry current to said contacts as here indicated. Any of the plans for braking may also be associated with any of the forms of driving as may be found desirable or convenient.

The tower or central station may be located at any suitable point and, inasmuch, as each track or section of track has a controller to itself, one or more operators may be employed in the tower, but it is preferable to have the sections of any one track all in charge of one operator. Should the location of the system described be such that some of the tracks and cars may be out of view from the tower, some suitable form of location indicator may be installed in the tower. The system, however, is mainly intended for use where all the cars will at all times be within sight of the tower or operating station.

It will be observed that I have made possible the complete control of a locomotive by means of only two conductors and one of these can be the track rails. By reversing the current through these two conductors the motor can be driven in one direction or the other as desired and by cutting off the current not only is the motor stopped but a brake is applied to retard the rotation of the wheels. In Fig. 1 the brake comprises the two disks 37 and 38 which automatically come into action when the worm wheel is locked against rotation upon the stopping of the motor. In the construction shown in the lower part of Fig. 2, the brake is applied by means of the spring 41 which is permitted to act when the magnet 42 is automatically deënergized upon the stopping of the motor. Each of these brake devices therefore constitutes means for automatically retarding the rotation of one of the axles when the motor is deënergized, each being controlled from a distant point definitely and at will by means of the electric circuit which energizes the motor.

In the construction shown at F in Fig. 2, the braking action is effectively controlled from a distance through the electric circuit of the motor but by reversing the motor rather than by stopping it.

The invention claimed is:—

1. In a system of motor car control, the combination of a car having track wheels and axles, a motor on the car, a plurality of stationary conductors, contacts on the car adapted to engage the conductors, wires for connecting the said conductors with a source of electric energy, controlling devices connected with the said wires and adapted to enable an operator at a fixed point distant from the car to stop or start the motor, and means for transmitting the power of the motor to one of the axles when the motor is rotating and automatically retarding the rotation of one of the axles when the motor is deënergized.

2. In a system of motor car control, the combination of a car having track wheels and axles, a motor on the car, a plurality of stationary conductors, contacts on the car adapted to engage the conductors, wires for connecting the said conductors with a source of electric energy, controlling devices connected with the said wires and conductors and adapted to enable an operator at a fixed point distant from the car to stop or start the motor, a worm connected with the motor to be driven thereby, a worm wheel, and connections between the worm wheel and one of the axles comprising a friction clutch, the worm serving when the motor is idle to lock one of the elements of the friction clutch against rotation to brake the car.

3. In a system of motor car control, the combination of a car having track wheels and axles, a motor on the car operatively connected to one of the axles, a plurality of stationary conductors, contacts on the car adapted to engage the conductors, wires for connecting the said conductors with a source of electric energy, controlling devices connected with the said wires and adapted to enable an operator at a fixed point distant from the car to start or stop the motor, and means controlled by the electric circuit through the said conductors and motor operating automatically when the motor is deenergized to resist rotation of one of the axles.

4. In a system of motor car control, the combination of a car having track wheels and axles, a motor on the car, a plurality of stationary conductors, contacts on the car adapted to engage the conductors, wires for connecting the said conductors with a source of electric energy, controlling devices connected with the said wires and conductors and adapted to enable an operator at a fixed point distant from the car to start or stop or reverse the motor, and driving connections between the motor and one of the axles comprising a friction clutch the driving element of which is adapted through control of the motor to be held against movement with the driven element thereby acting as a brake to stop the car.

5. In a system of motor car control, the combination of the car having track wheels and axles, a motor on the car, two stationary conductors, contacts on the car adapted to engage the conductors, wires for connecting the said conductors with the source of electric energy, means located at a distance from the car for controlling the circuit through the said wires and conductors, electrical connections on the car between the said contacts and the motor comprising a switch mechanism for changing the motor connections to start, stop and reverse the rotation of the motor, controlling means for the switch mechanism operated by the electric current supply to the motor, and means controlled by the electric circuit through said conductors and motor operating automatically when the motor is deënergized to resist rotation of one of the axles.

In testimony whereof I affix my signature, in presence of two witnesses.

FRANK L. SESSIONS.

Witnesses:
  E. P. SNIVELY,
  C. E. WAXBOM.